(12) United States Patent
Frohlich et al.

(10) Patent No.: US 7,110,619 B2
(45) Date of Patent: Sep. 19, 2006

(54) ASSISTED READING METHOD AND APPARATUS

(75) Inventors: David Mark Frohlich, Bristol (GB);
David Arthur Grosvenor, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 759 days.

(21) Appl. No.: 10/283,239

(22) Filed: Oct. 30, 2002

(65) Prior Publication Data

US 2003/0082505 A1 May 1, 2003

(30) Foreign Application Priority Data

Oct. 31, 2001 (GB) ................................ 0126206.2

(51) Int. Cl.
  *G06K 9/36* (2006.01)
  *G06K 7/10* (2006.01)
  *G09B 17/04* (2006.01)

(52) U.S. Cl. .................. 382/292; 235/462.25; 434/180

(58) Field of Classification Search ................ 382/276, 382/292, 312, 305; 235/487, 494, 375, 462.23, 235/462.24, 462.25; 434/180
See application file for complete search history.

(56) References Cited

U.S. PATENT DOCUMENTS 3,870,814 A * 3/1975 Woods et al. ............... 348/107
5,003,613 A * 3/1991 Lovelady et al. ........... 382/163
5,661,506 A * 8/1997 Lazzouni et al. ........... 345/179
6,330,976 B1 * 12/2001 Dymetman et al. ......... 235/487

FOREIGN PATENT DOCUMENTS

| EP | 0 591 580 A1 | 4/1994 |
| EP | 0 622 722 A2 | 11/1994 |
| WO | WO 95/10813 | 4/1995 |

* cited by examiner

*Primary Examiner*—Kanjibhai Patel
(74) *Attorney, Agent, or Firm*—Foley & Lardner LLP (57) ABSTRACT

An automated method and apparatus for assisting a reader to read a printed or scribed document that cites, directly or indirectly, other information. A camera focuses down on the document for generating video signals representing an image of the document in electronic form, and a processor linked to the camera processes the image of the document captured by the camera, the processor being configured to fetch information from a database when a user, by pointing to a position on the document, selects a position within the image. The document is placed within the field of view of the camera and finger or pointing implement is placed within the field of view of the camera to a selected position on the document. The camera captures an image of the document and of the finger or pointing implement overlying the document. The processor processes the captured image to recognize the position on the document selected by the finger or pointing implement and information is fetched that is cited, directly or indirectly, at that position in the page of the document.

20 Claims, 5 Drawing Sheets

ASSISTED READING METHOD AND APPARATUS

FIELD OF THE INVENTION

The present invention relates to an automated assisted reading method and apparatus.

BACKGROUND TO THE INVENTION

Reading technical paper documents is sometimes frustrating when associated material is cited in the text. For example, readers are expected to access separate paper documents for every reference in a printed bibliography and these are often not readily to hand. Furthermore, this conventional method of citation cannot easily accommodate multimedia materials such as associated audio or video items.

Converting technical documents into electronic form, held in computer memory and to be selectively displayed on a screen, appears to provide one solution to these problems since associated material could then be encoded with the source material and accessed automatically by selecting hyperlinked areas on source pages. On-line help systems work in this way. E-books could work in this way but tend not to. However, the coverage of textual sources represented by on-line help systems is extremely restricted, and both the on-line and e-book approaches require users to relocate their primary reading activity from paper to screen technology.

Over the decades since electronic computers were first invented, office practices have become dominated by them and information handling is now very heavily based in the electronic domain of the computer. The vast majority of documents are prepared, adapted, stored and even read in electronic form on computer display screens. Furthermore, in parallel to this, computer interface technology has advanced from there being a predominantly physical interface with the computer using punched cards, keypads or keyboards for data entry—to the extensive present-day reliance on use of cursor moving devices such as the mouse for interacting with the screen-displayed essentially electronic interface known as the Graphical User Interface (GUI), a paradigm that is in use universally in applications such as Windows®. The Graphical User Interface can be regarded as a virtual interface comprising operator key icons that replace the pushbutton keys of a physical keyboard.

The drive towards handling documents electronically and also representing hardware computer interlaces in a predominantly electronic form has been relentless since, amongst other obvious benefits, software implementations of hardware occupy no space and may be many orders of magnitude cheaper to produce. Nevertheless, electronic versions of documents and virtual interfaces do not readily suit the ergonomic needs of all users and uses. For some tasks, reading included, paper-based documents remain much more user friendly than screen-based documents. Hard copy paper versions of electronic documents are still preferred by many for proofreading or general reviews, since they are of optimally high resolution and flicker-free and less liable to give the reader eye-strain, for example.

In recent years the Xerox Corporation have been in the vanguard of developments to better integrate beneficial elements of paper based documents with their electronic counterpart. In particular they have sought to develop interface systems that heighten the level of physical interactvity and make use of computers to enhance paper-based operations.

Their European patent EP 0,622,722 describes an interactive copying system in which an original paper document lying on a work surface is scanned by an overhead camera linked to a processor/computer to monitor the user's interaction with text or images on the paper document. An action such as pointing to an area of the paper document can be used to select and manipulate an image taken by the camera of the document and the image or a manipulated form of it is then projected back onto the work surface as a copy or modified copy. The Xerox interactive copying system is suited to this role but is not optimally compact, cost efficient and well adapted for other paper-based activities than document copying and transformation. It is not adapted for reading activities.

SUMMARY OF THE INVENTION

According to a first aspect of the present invention there is provided an automated method for assisting a reader to read a printed or scribed document that cites, directly or indirectly, other info on (e.g. other documents or audio-visual sequences), which method comprises:

a) providing apparatus comprising a camera to focus down on to a said document for generating video signals representing an image of the document in electronic form, and a processor linked to the camera for processing the image of the document captured by the camera, the processor being configured to fetch information from a database when a user, by pointing to a position on the document, selects a position within the image;

b) placing the document within the field of view of the camera and pointing by finger or pointing implement within the field of view of the camera to a selected position on the document;

c) the camera capturing an image of the document and of the finger or pointing implement overlying the document; and d) the processor then processing the captured image, recognising the position on the document selected by the finger or pointing implement and fetching information that is cited, directly or indirectly, at that position in the document Preferably the processor is configured to process the captured image to identify the document in the captured image. Where the document is a page of a multi-page item, such as, for example, a book or brochure, the processor suitably identifies the multi-page item and which page of the multi-page item is represented in the captured image.

The printed document is preferably, and suitably at time of printing, marked with a distinctive identifying symbol or code which is recognisable by the processor. The symbol or code is preferably readily machine readable and may comprise a bar code or dataglyph, and suitably a two-dimensional bar code.

Such an identifying symbol or code facilitates rapid and reliable recognition of the printed document by the processor. In absence of an identifying symbol or code the processor may alternatively be configured to recognise the printed hypertext document by recognition of the pattern of the text and/or drawings of the document. Optical Character Recognition (OCR) is another basis on which page identification may be carried out.

The printed document may be marked with distinctive calibration marks and which are suitably located proximate different respective extremities of the document. The processor is preferably configured to recognise the distinctive calibration marks on the printed document to facilitate determination of the pose of the printed document with respect to the camera and facilitate registration of the camera view of the printed document.

The fetched information, if text or images, is suitably displayed on a screen associated with the processor The information is suitably held in a database in a memory within or linked to the processor. In a preferred embodiment this memory is local to the processor and not accessed via the Internet. It may, for example, comprise a CD ROM that is read by a CD ROM drive of the processor.

According to a second aspect of the present invention there is provided an apparatus for assisting a reader to read a printed or scribed document that cites, directly or indirectly, other information, which apparatus comprises:

a camera to focus down on to a said document for generating video signals representing the document in electronic form;

a processor linked to the camera for processing the image of the document captured by the camera and the processor being configured to fetch from a database information that is cited, directly or indirectly, at a position in the document in response to the reader selecting that position by pointing to it with a finger or other pointing implement within the field of view of the camera.

Both in the apparatus and in the method the processor suitably has or is linked to a memory holding a look-up table which dictates to the processor the address in the database from which the cited information may be fetched that corresponds to the position in the image selected by the reader The apparatus of the present invention preferably comprises a pointing implement, which may suitably be generally in the form of a pen, that has an associated selector and is operatively linked to the processor to enable the user to designate to the processor when the pointing implement us pointing to tee desired hyperlink region of the printed hypertext document. The selector is preferably a button on the implement and may suitably be provided at the tip of the implement.

Particularly preferably the selector provides a signal confirmatory of when a selection is made. The apparatus suitably gives an auditory signal e.g. such as a clicking noise. Where a pen-shaped implement is used, for example, this may conveniently have a click-button at its upper end.

In a further general aspect the present invention provides a method for accessing information that is cited, directly or indirectly in a printed or scribed document, which method comprises processing by a processor an image captured by a camera of a printed or scribed document and of a finger or pointing implement overlying the printed or scribed document, the processor recognising a position on the document pointed to by the finger or pointing implement and fetching information that is cited, directly or indirectly, at that position in the document.

The invention also provides a computer program for accessing information that is cited, directly or indirectly in a printed or scribed document the program being configured to direct a processor to: process an image captured by a camera of a printed or scribed document and of a finger or pointing implement overlying the printed or scribed document; recognise a position on the document pointed to by the finger or pointing implement and fetch information that is cited, directly or indirectly, at that position in the document.

BRIEF DESCRIPTION OF THE DRAWINGS

A preferred embodiment of the present invention will now be more particular described, by way of example, with reference to the accompanying drawings, wherein.

DESCRIPTION OF THE PREFERRED EMBODIMENT

Figure 1:
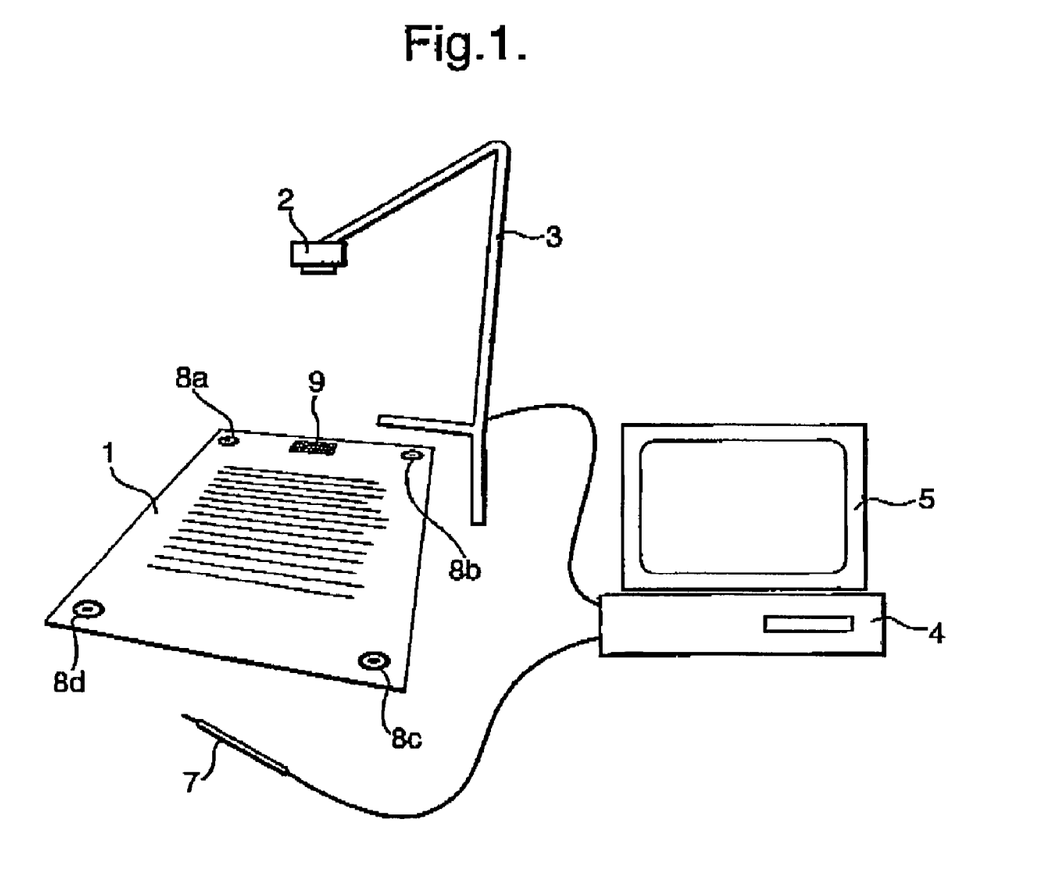
FIG. 1 is a simple system architecture diagram.

Referring firstly to FIG. 1, this illustrates an embodiment of the system of the present invention, as set up for operation. The system/apparatus comprises, in combination, a printed or scribed document 1, in this case a sheet of paper that is suitably, for example, a printed page from a holiday brochure; a camera 2, that is suitably a digital camera and particularly suitably a digital video camera, which is held above the document 1 by a stand 3 and focuses down on the document 1, a processor/computer 4 to which the camera 2 is linked, the computer suitably being a conventional PC having an associated VDU/monitor 5; and a pointer 7 with a pressure sensitive tip or selector button and which is linked to the computer 4.

Figure 2:
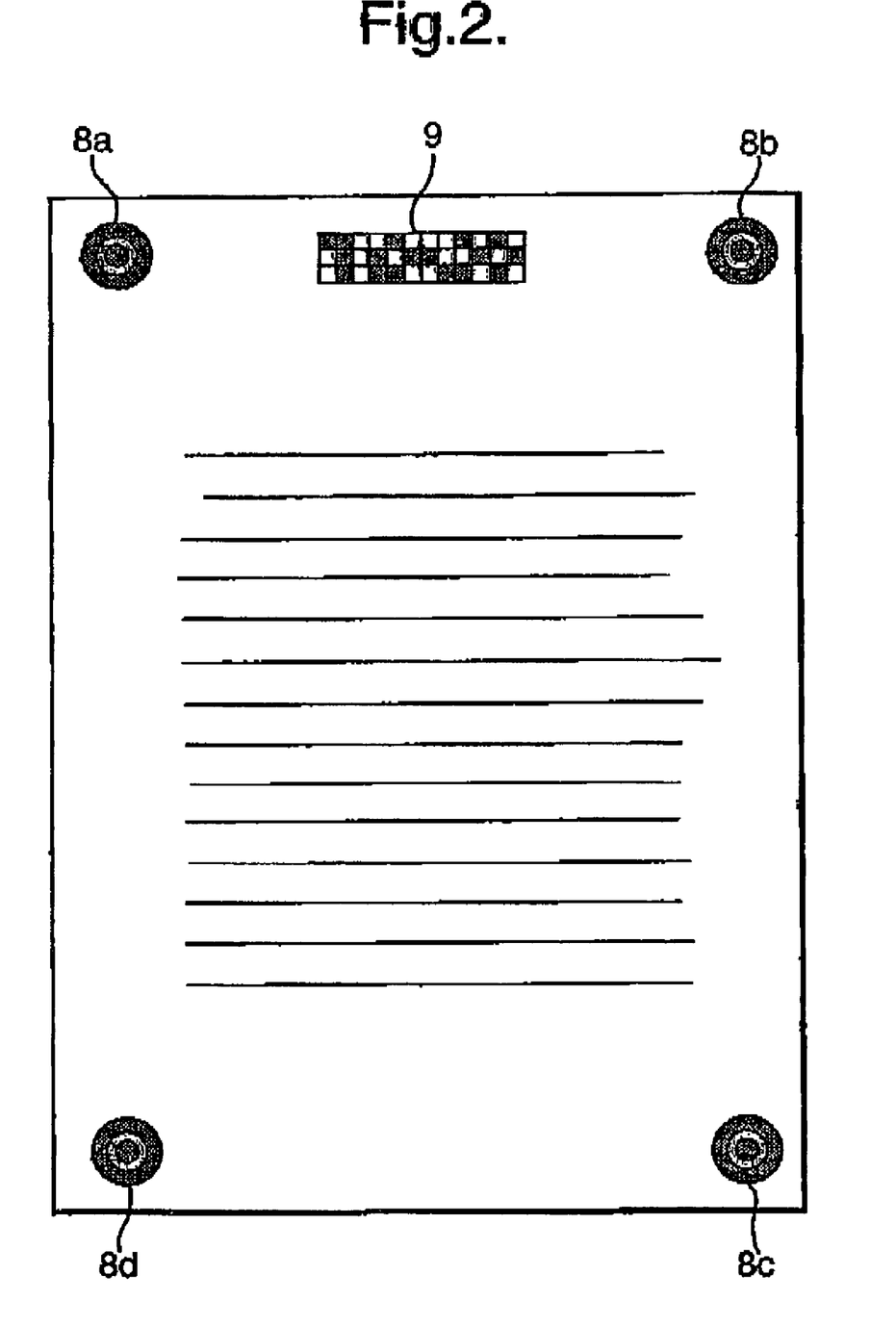
FIG. 2 is a plan view of a printed paper document with calibration marks and a page identification mark.

The document 1 differs from a conventional printed brochure page in that it bears a set of four calibration marks 8a–8d, one mark 8a–d proximate each corner of the page, in addition to a two-dimensional bar code which serves as a readily machine-readable page identifier mark 9 and which is located at the top of the document 1 substantially centrally between the top edge pair of calibration marks 8a. 8b.

The calibration marks 8a–8d are position reference marks that are designed to be easily differentiable and localisable by tee processor of the computer 4 in the electronic images of the document 1 captured by the overhead camera 2.

Figure 3:
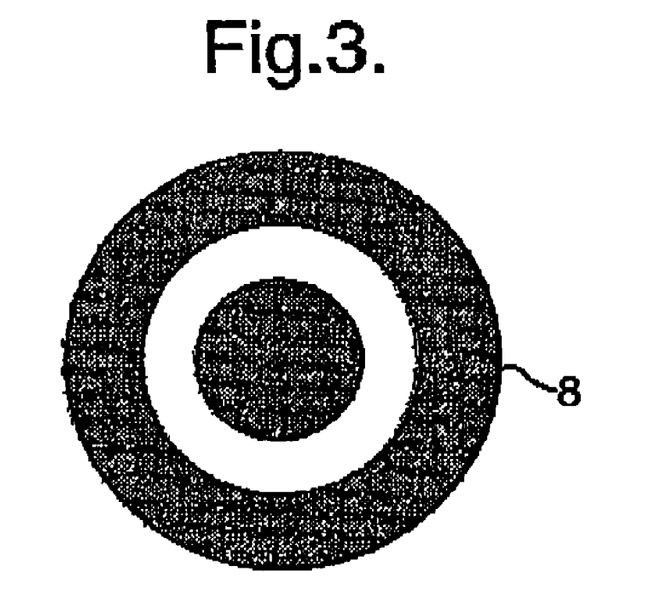
FIG. 3 is a close-up plan view of one of the calibration marks.

The illustrated calibration marks 8a–8d are simple and robust, each comprising a black circle on a white background with an additional black circle around it as shown in FIG. 3. This gives three image regions that share a common centre (central black disc with outer white and black rings). This relationship is approximately preserved under moderate perspective projection as is the case when the target is viewed obliquely.

It is easy to robustly locate such a mark 8 in the image taken from the camera 2. The black and white regions are made explicit by thresholding the image using either a global or preferably a locally adaptive thresholding technique. Examples of such techniques are described in:

Gonzalez R. & Woods R. Digital Image Processing, Addison-Wesley, 1992, pages 443–455; and Rosenfeld A. & Kak A. Digital Picture Processing (second edition), Volume 2, Academic Press, 1982, pages 61–73.

After thresholding, the pixels that make up each connected black or white region in the image are made explicit using a component labelling technique. Methods for performing connected component labelling/analysis both recursively and serially on a raster by raster basis are described in: Jain R., Kasturi R. & Schunk S. Machine Vision, McGraw-Hill, 116, pages 42–47 and Rosenfeld A. & Kak A. Digital Picture Processing (second edition), Volume 2, Academic Press, 1982, pages 240–250.

Such methods explicitly replace each component pixel with a unique label.

Black components and white components can be found through separate applications of a simple component labelling technique. Alternatively it is possible to identify both black and white components independently in a single pass through the image. It is also possible to identify components implicitly as they evolve on a raster by raster basis keeping only statistics associated with the pixels of the individual connected components (this requires extra storage to manage the labelling of each component).

In either case what is finally required is the centre of gravity of the pixels that make up each component and statistics on its horizontal and vertical extent. Components that are either too large or too small can be eliminated straight off. Of the remainder what we require are those which approximately share the same centre of gravity and for which the ratio of their horizontal and vertical dimensions agrees roughly with those in the calibration mark 8. An appropriate black, white, black combination of components identifies a calibration mark 8 in the image. Their combined centre of gravity (weighted by the number of pixels in each component) gives the final location of the calibration mark 8.

The minimum physical size of the calibration mark 8 depends upon the resolution of the sensor/camera 2. Typically the whole calibration mark 8 must be more than about 60 pixels in diameter. For a 3MP camera imaging an A4 document there are about 180 pixels to the inch so a 60 pixel target would cover $\frac{1}{3}^{rd}$ of an inch. It is particularly convenient to arrange four such calibration marks 8a–d at the corners of the page to form a rectangle as shown in the illustrated embodiment FIG. 2.

For the simple case of fronto-parallel (perpendicular) viewing it is only necessary to correctly identify two calibration. Marks 8 in order to determine the location, orientation and scale of the documents. Furthermore for a camera 2 with a fixed viewing distance the scale of the document 1 is also fixed (in practice the thickness of the document, or pile of documents, affects the viewing distance and, therefore, the scale of the document).

In the general case the position of two known calibration marks 8 in the image is used to compute a transformation from image coordinates to those of the document 1 (e.g. origin at the top left hand corner with the x and y axes aligned with the short and long sides of the document respectively). The transformation is of the form:

$$\begin{bmatrix} X' \\ Y' \\ 1 \end{bmatrix} = \begin{bmatrix} k\cos\theta & -\sin\theta & t_x \\ \sin\theta & k\cos\theta & t_y \\ 0 & 0 & 1 \end{bmatrix} \begin{bmatrix} X \\ Y \\ 1 \end{bmatrix}$$

Where (X, Y) is a point in the image and (X', Y') is the corresponding location on the document (1) with respect to the document page coordinate system. For these simple 2D displacements the transform has three components: an angle θ a translation ($t_x$; $t_y$) and a overall scale factor k. These can be computed from two matched points and the imaginary line between them using standard techniques (see for example: HYPER: A New Approach for the Recognition and Positioning of Two-Dimensional Objects, IEEE Trans. Pattern Analysis and Machine Intelligence, Volume 8, No. 1, January 1986, pages 44–54).

With just two identical calibration marks 8a, 8b it may be difficult to determine whether they lie on the left or right of the document or the top and bottom of a rotated document 1 (or in fact at opposite diagonal corners). One solution is to use non-identical marks 8, for example, with different numbers of rings and/or opposite polarities (black and white ring order). This way any two marks 8 can be identified uniquely.

Alternatively a third mark 8 can be used to disambiguate. Three marks 8 must form an L-shape with the aspect ratio of the document 1. Only a 180 degree ambiguity then exists for which the document 1 would be inverted for the user and thus highly unlikely to arise Where the viewing direction is oblique (allowing the document 1 surface to be non-fronto-parallel or extra design freedom in the camera 2 rig) it is necessary to identify all four marks 8a–8d in order to compute a transformation between the viewed image coordinates and the document 1 page coordinates.

The perspective projection of the planar document 1 page into the image undergoes the following transformation:

$$\begin{bmatrix} x \\ y \\ w \end{bmatrix} = \begin{bmatrix} a & b & c \\ b & e & f \\ g & h & 1 \end{bmatrix} \begin{bmatrix} X \\ Y \\ 1 \end{bmatrix}$$

Where X'=x/w and Y'=y/w.

Figure 4:
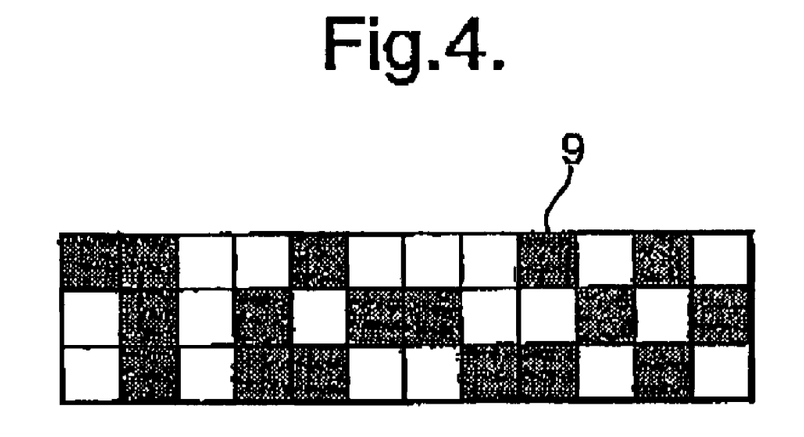
FIG. 4 is a close-up plan view of the page identification mark comprising a two-dimensional bar code.

Once the transformation has been computed then it can be used to locate the document page identifier bar code 9 from the expected co-ordinates for its location that are held in a register in the computer 4. Also the computed transformation can be used to map events (e.g. pointing) in the image to hyperlinks on the page (in its electronic form).

Figure 5:
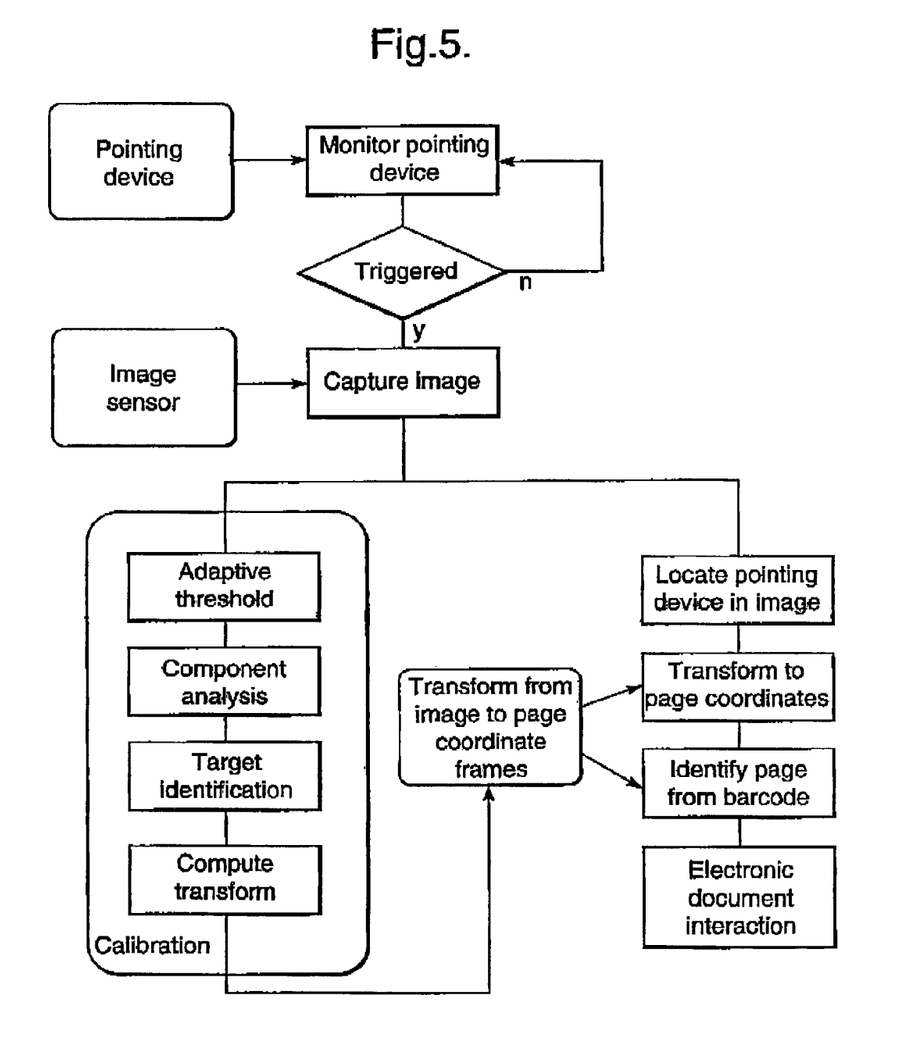
FIG. 5 is a flow chart demonstrating the operation of the system.

The flow chart of FIG. 5 shows a sequence of actions that are suitably carried out in using the system and which is initiated by triggering a switch associated with a pointing device 7 for pointing at the document 1 with the field of view of the camera 2 image sensor. The triggering causes capture of an image from the camera 2, which is then processed by the computer 4

As noted above, in the embodiment of FIG. 1 the apparatus comprises a tethered pointer 7 with a pressure sensor at its tip that may be used to trigger capture of an image by the camera 2 when the document 1 is tapped with the tip of the pointer 7. This image is used for calibration to calculate the mapping from image to page co-ordinates; for page identification from the barcodes; and to identify the current location of the end of the pointer 7.

The calibration and page identification operations are best performed in advance of mapping any pointing movements in order to reduce system delay.

The easiest way to identify the tip of the pointer would be to use a readily differentiated locatable and identifiable special marker at the tip. However, other automatic methods for recognising long pointed objects could be made to work. Indeed, pointing may be done using the operator's finger provided that the system is adapted to recognise it and respond to a signal such as tapping or other distinctive movement of the finger or operation of a separate switch to trigger image capture.

In carrying out the assisted reading method of the present invention, having placed the printed or scribed document 1 under the camera 2 and allowed the processor 4 to carry out the calibration, the user points to an area on the document 1 in order to trigger fetching of associated content stored in a database held in a memory in the computer 4 accessible by the computer 4, for example via the internet By way of example of the use of this system to read printed documents with indirect/implicit references, this could be in the context of a department store paper catalogue co-designed to work with an on-line website or a CD ROM. Here, the printed material may be published with a look-up table of page regions and their associated references/addresses in the electronic database. Alternatively the look up table could be solely held in a memory in the processor 4. The table used by the image pressing software in the processor 4 to interpret pointing actions on a page 1 placed within the field of view of the camera 2 as a hot link to further information. For example, touching a printed picture of a product may result in the fetching and screen-display of a video usage scenario, a list of product features, or an order form. In this way a paper brochure can very conveniently serve as an interface to related content of an electronic database and greatly facilitate reading of the brochure and accessing of related information. Where the database is accessed via the web, this content may be updated more frequently than the paper brochure with current prices, deals and other information.

Figure 6:
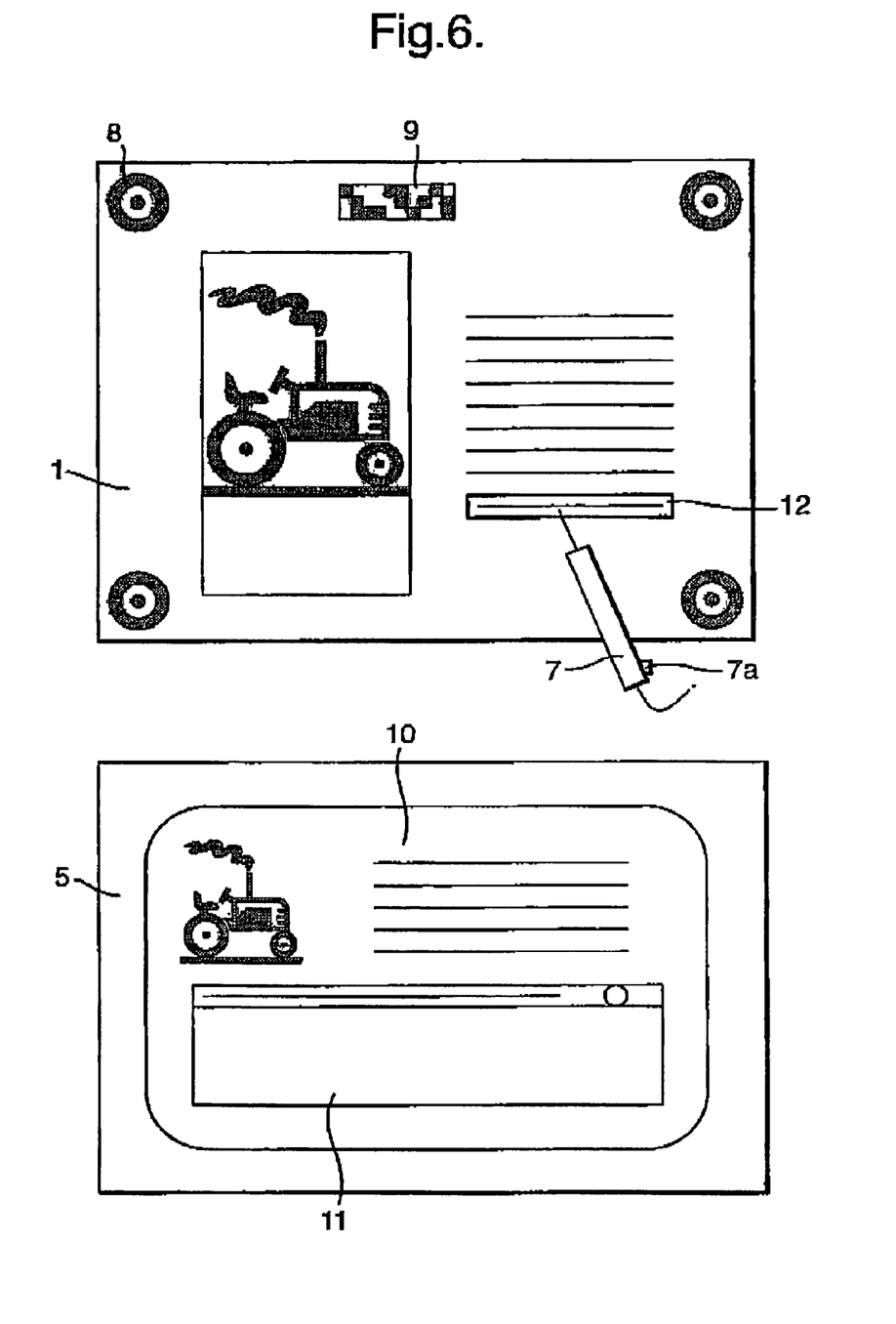
FIG. 6 is an illustration of a screen display viewed by a user in operation of an embodiment of the invention.

An example of what will be seen by the user in such an arrangement is shown in FIG. 6. A catalogue page 1 with calibration marks 8 and a page identifier mark 9 contains a selection area 12 which is located by the user with the tip of pointer 7 and in this instance selected by activating switch 7a on the side of pointer 7. Selection of the selection area (which may, for example, be interpretable by the computer system as representing a hyperlink) by the user in this manner causes the computer to display a related web page 10 on visual display unit 5—the web page 10 here having a form area 11 allowing the user to obtain further information on, or to order, a product identified on catalogue page 1 and confirmed on web page 10. In this manner, a user may order or request information on goods electronically by seamless interaction with an original paper reference source.

The invention claimed is:

1. An automated method for assisting a reader to read a printed or scribed document that cites, directly or indirectly, other information, said method comprising:
   a) providing an apparatus comprising a camera to focus down on to said document for generating video signals representing an image of the document in electronic form, and a processor linked to the camera for processing the image of the document captured by the camera, the processor being configured to fetch information from a database when a user, by pointing to a position on the document, selects a position within the image;
   b) placing the document within the field of view of the camera;
   c) searching for first predetermined images provided on top right, top left, bottom right, and bottom left positions of the document;
   d) finding at least two of the first predetermined images provided on the document;
   e) based on the finding of the at least two of the first predetermined images, finding a second predetermined image provided on the document, the second predetermined image including information regarding a type of the document;
   f) pointing, by finger or pointing implement within the field of view of the camera, to a selected position on the document;
   g) capturing, by the camera, an image of the document and of the finger or pointing implement overlying the document; and
   h) processing, by the processor, the captured image to recognize the position on the document selected by the finger or pointing implement and fetching information from the database that is cited, directly or indirectly, at the recognized position in the document.

2. A method as claimed in claim 1, wherein prior to processing the captured image to recognize the position pointed to, the processor processes the captured image to identify the document in the captured image.

3. A method as claimed in claim 1, wherein after fetching information, the fetched information is displayed on a screen linked to the processor.

4. A method as claimed in claim 1, wherein the processor accesses a lookup table in a memory within or linked to the processor to determine an address in the database from which the cited information may be fetched that corresponds to the position in the image selected by the reader.

5. A method as claimed in claim 1, wherein the information is fetched from a database in a local memory within or linked to the processor.

6. A method as claimed in claim 1, wherein the first predetermined images corresponds to bulls-eyes with alternative white and block annular regions, and
   wherein the second predetermined image corresponds to a region divided up into a plurality of same-sized blocks, each of the blocks being either a first color indicating a first binary value or a second color indicating a second binary value.

7. A method as claimed in claim 1, wherein the selected position on the document corresponds to a visual image of a product, and
   wherein the processor fetches the information relating to the product from an Internet web page that has stored therein information on the product.

8. A method for accessing information that is cited, directly or indirectly in a printed or scribed document, said method comprising:
   processing, by a processor, an image captured by a camera of a printed or scribed document and of a finger or pointing implement overlying the printed or scribed document;
   searching for first predetermined images provided on top right, top left, bottom right, and bottom left positions of the document;
   finding at least two of the first predetermined images provided on the document;
   based on the finding of the at least two of the first predetermined images, finding a second predetermined image provided on the document, the second predetermined image including information regarding a type of the document;
   recognizing, by the processors, a position on the document pointed to by the finger or pointing implement; and
   fetching information, from a source external to the document, that is cited, directly or indirectly, at the recognized position in the document.

9. A method as claimed in claim 8, wherein prior to processing the captured image to recognize the position pointed to, the processor processes the captured image to identify the document in the captured image.

10. A method as claimed in claim 8, wherein after fetching information that is cited, the fetched information is displayed on a screen linked to the processor.

11. A method as claimed in claim 8, wherein the processor accesses a lookup table in a memory within or linked to the processor to determine an address in the database from which the cited information may be fetched that corresponds to the position in the image selected by a user.

12. A method as claimed in claim 8, wherein the processor fetches information from a database in a local memory within or linked to the processor.

13. A method as claimed in claim 8, wherein the first predetermined images corresponds to bulls-eyes with alternative white and block annular regions, and
wherein the second predetermined image corresponds to a region divided up into a plurality of same-sized blocks, each of the blocks being either a first color indicating a first binary value or a second color indicating a second binary value.

14. A method for accessing information that is cited, directly or indirectly, in a printed or scribed document, said method comprising:
a) providing an apparatus comprising a camera to focus down on to said document for generating video signals representing an image of the document in electronic form, and a processor linked to the camera for processing the image of the document captured by the camera, the processor being configured to fetch information from a database when a user, by pointing to a position on the document, selects a position within the image;
b) searching for first predetermined images provided on top right, top left, bottom right, and bottom left positions of the document;
c) finding at least two of the first predetermined images provided on the document;
d) based on the finding of the at least two of the first predetermined images, finding a second predetermined image provided on the document, the second predetermined image including information regarding a type of the document;
e) placing the document within the field of view of the camera and pointing by finger or pointing implement within the field of view of the camera to a selected position on the document;
f) capturing, by the cameras an image of the document and of the finger or pointing implement overlying the document; and
g) processing, by the processor, the captured image, recognizing the position on the document selected by the finger or pointing implement, and fetching information from the database that is cited, directly or indirectly, at the recognized position in the document.

15. A method as claimed in claim 14, wherein the first predetermined images corresponds to bulls-eyes with alternative white and block annular regions, and
wherein the second predetermined image corresponds to a region divided up into a plurality of same-sized blocks, each of the blocks being either a first color indicating a first binary value or a second color indicating a second binary value.

16. An apparatus for assisting a reader to read a printed or scribed document which cites, directly or indirectly, other information, said apparatus comprising:
a camera to focus down on to said document for generating video signals representing the document in electronic form; and
a processor linked to the camera for processing the image of the document captured by the camera, the processor being configured to fetch, from a database, information that is cited, directly or indirectly, at a position in the document in response to a reader selecting that position by pointing to it with a finger or other pointing implement within the field of view of the camera,
wherein the processor is configured to, based on the video signals, search for first predetermined images provided on top right, top left, bottom right, and bottom left positions of the document,
wherein the processor is configured to find at least two of the first predetermined images provided on the document, based on the detecting of the at least two of the first predetermined images, and
wherein the processor is configured to find a second predetermined image provided on the document, the second predetermined image including information regarding a type of the document.

17. An apparatus as claimed in claim 16 wherein the processor has or is linked to a memory holding a look-up table which dictates to the processor an address in the database from which the cited information may be fetched that corresponds to the position in the image selected by the reader.

18. An apparatus as claimed in claim 16, wherein the first predetermined images corresponds to bulls-eyes with alternative white and block annular regions, and
wherein the second predetermined image corresponds to a region divided up into a plurality of same-sized blocks, each of the blocks being either a first color indicating a first binary value or a second color indicating a second binary value.

19. A computer program embodied in a computer readable medium for accessing information that is cited, directly or indirectly in a printed or scribed document, the computer program being configured to direct a processor to:
process an image captured by a camera of the printed or scribed document and of a finger or pointing implement overlying the printed or scribed document;
search for first predetermined images provided on top right, top left, bottom right, and bottom left positions of the document;
find at least two of the first predetermined images provided on the document;
based on the finding of the at least two of the first predetermined images, find a second predetermined image provided on the document, the second predetermined image including information regarding a type of the document;
recognize a position on the document pointed to by the finger or pointing implement; and
fetch information, from a source external to the document, that is cited, directly or indirectly, at the recognized position in the document.

20. A computer program as claimed in claim 19, wherein the first predetermined images corresponds to bulls-eyes with alternative white and block annular regions, and
wherein the second predetermined image corresponds to a region divided up into a plurality of same-sized blocks, each of the blocks being either a first color indicating a first binary value or a second color indicating a second binary value.

* * * * *